Figure 2:
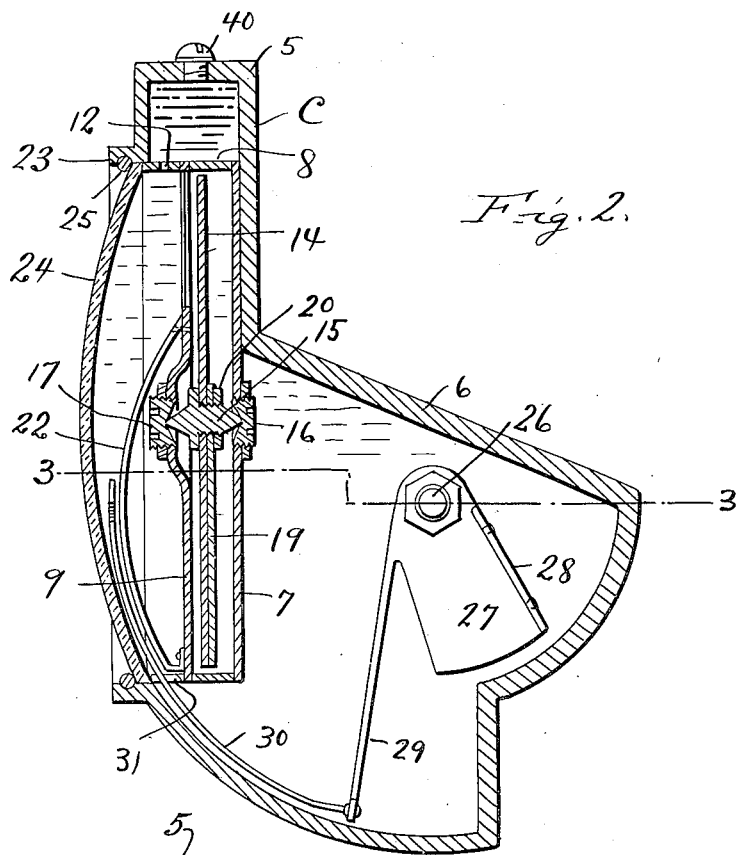

June 14, 1932. D. O. JOHNSON ET AL 1,863,044
PENDULUM BANK AND CLIMB INDICATOR FOR AEROPLANES
Filed Dec. 10, 1929   3 Sheets-Sheet 1
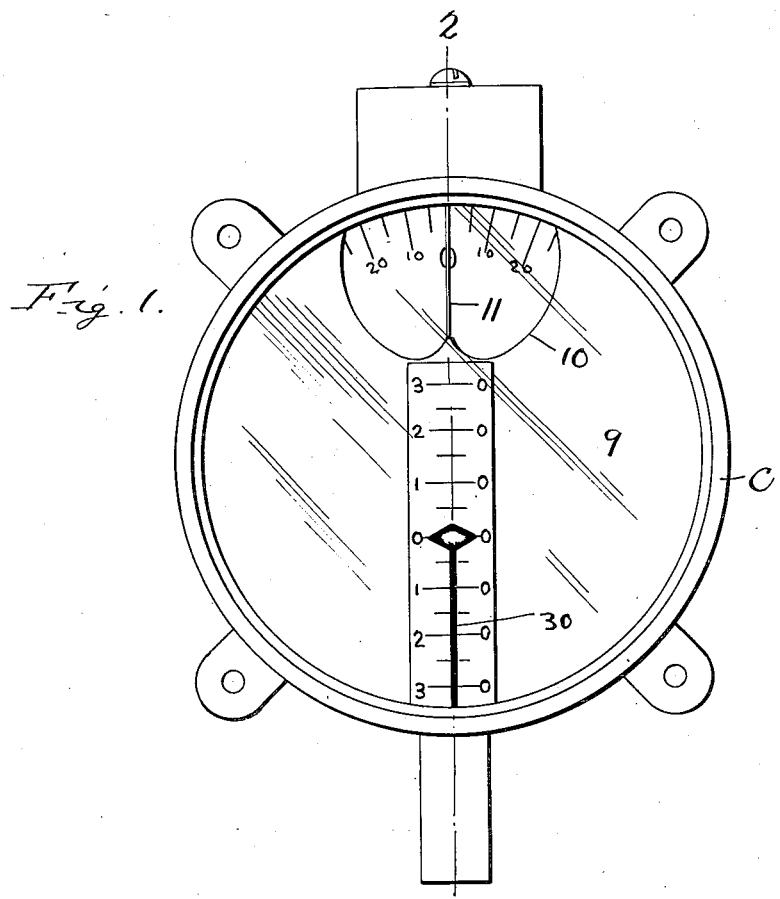
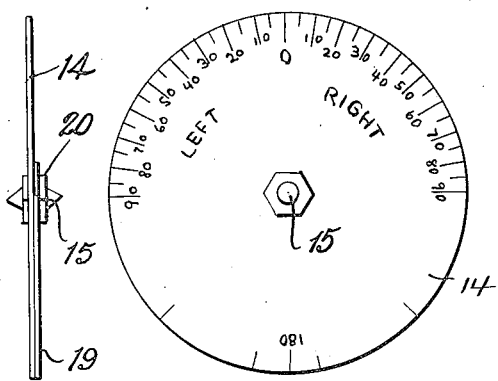
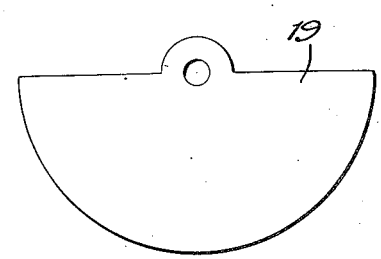
Inventors
Delbert O. Johnson
Walter W. Webster
By Clarence A. O'Brien
Attorney Inventors
Delbert O. Johnson
Walter W. Webster
By Clarence A. O'Brien
Attorney June 14, 1932. D. O. JOHNSON ET AL 1,863,044
PENDULUM BANK AND CLIMB INDICATOR FOR AEROPLANES
Filed Dec. 10, 1929 3 Sheets-Sheet 3
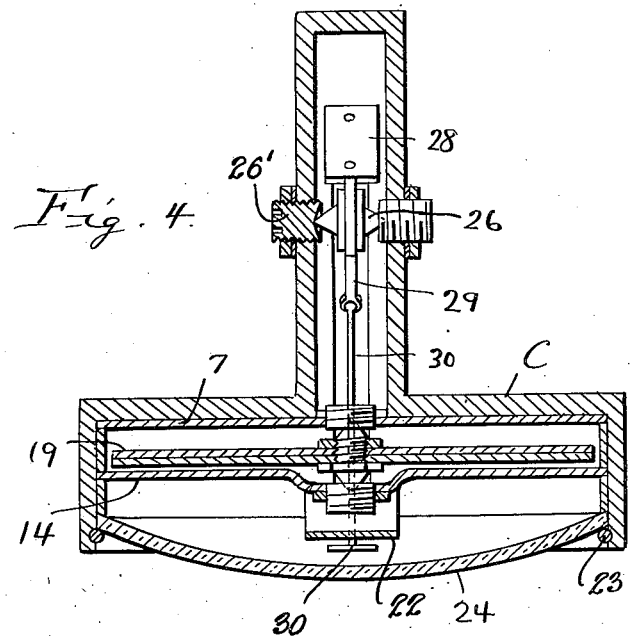
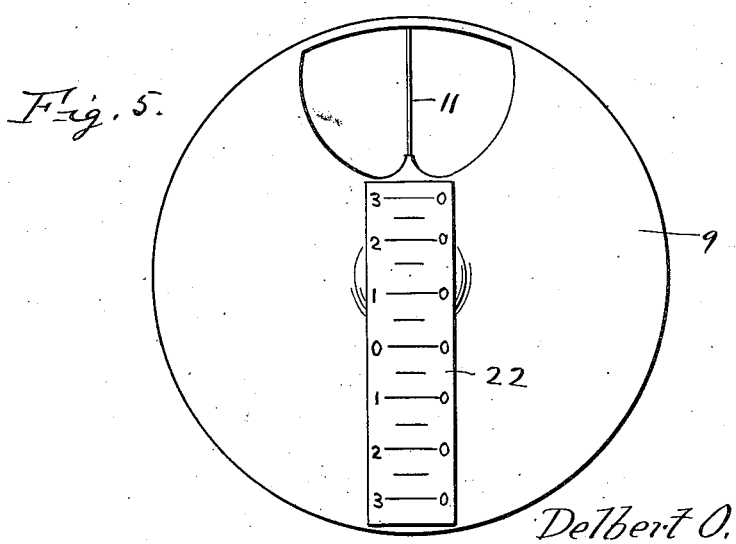
Inventors
Delbert O. Johnson
Walter W. Webster
By Clarence A. O'Brien
Attorney Patented June 14, 1932

1,863,044

UNITED STATES PATENT OFFICE

DELBERT O. JOHNSON AND WALTER W. WEBSTER, OF BLOOMINGTON, CALIFORNIA

PENDULUM BANK AND CLIMB INDICATOR FOR AEROPLANES

Application filed December 10, 1929. Serial No. 413,053.

The present invention relates to a bank and climb indicator for aircraft and has for its prime object to provide a device of this nature which is simple in its construction, and compact in its arrangement of parts.

In particular it is an object to provide a sensitive device in which the pair of indicators directly operated by independent pendulums without the intervention of gears or the like are associated to indicate banking and inclination on a pair of separate scales, both scales arranged in alignment and in the direction of vision of the operator so that at a glance and with a minimum effort both scales may be read.

With the above and other objects in view as will appear as the description proceeds, the invention resides in the combination and arrangement of parts as will be hereinafter described and claimed.

Figure 3:
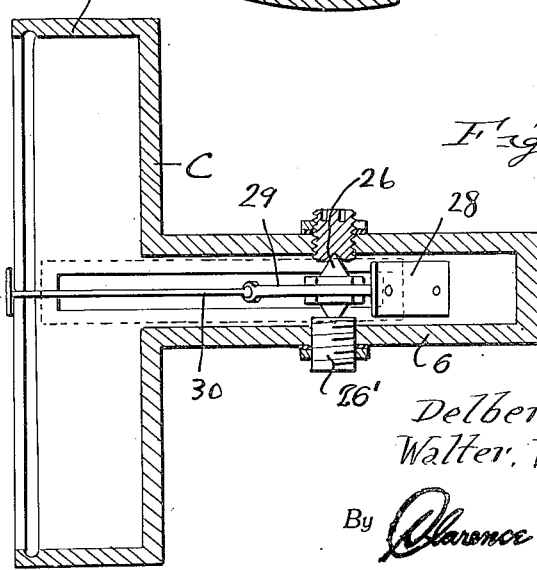

In the drawings:

Figure 1 is a front elevation of the instrument embodying the features of our invention, Figure 2 is a vertical section therethrough taken substantially on the line 2—2 of Figure 1, Figure 3 is a horizontal section taken substantially on the line 3—3 of Figure 2, Figure 4 is a similar section showing all parts in place, Figure 5 is a detail elevation of the front face plate, Figure 6 is an elevation of the indicating disk, Figure 7 is an edge view thereof, and Figure 8 is a detail view of the weight plate for the disk.

Referring to the drawings the letter C denotes generally a casing comprising a cylindrical portion 5 having a rearwardly and downwardly disposed relatively narrow extension 6. A rear circular plate 7 is fixed in the portion 5 and has an annular rim 8 projecting forwardly therefrom. In this rim 8 is front face plate 9 formed with an opening 10 in the top thereof with a wire 11 centrally across the opening.

An indicating disk 14 has a pintle 15 extending through the center thereof with both ends pointed and journaled in bearings 16 and 17 carried by the plates 7 and 9 respectively. A semi-circular weight plate 19 is engaged on the pintle 15 to the rear of the bottom portion of the dial disk 14, nut 20 holding the disk and plate assembled.

An elongated bowed indicator plate 22 is fixed on the front face plate 9 immediately below opening 10 and in alignment with wire 11. The portion 5 is open in front and has the flange 23 about the opening in which is fixed the concavo-convex transparent panel 24. A packing ring 25 is disposed in a groove to hold the panel 24 in position.

A pintle 26 is journaled in bearings 26' threaded through the sides of the portion 6 of the casing and has a pendulum 27 extending therefrom. A bilateral fin 28 is mounted on the rear edge of the pendulum. An arm 29 extends from the upper end of the pendulum at an acute angle thereto and carries from its lower end an arcuate pointer 30, which pointer passes through an opening 31 in the ring 8 cooperating with the indicia on the inclination indicator plate 22.

It should be noted that the pointer 30 and the indicator plate 22 are in the shape of segments of concentric circles whose common center is the pendulum 26, the circle of the indicator plate 22 being slightly smaller than that of the pointer 30. Therefore, the movement of the pointer 30 is parallel to the plate 22 at all times.

The indicia on the dial 14 cooperates with the wire 11. The indicia mentioned above may be of luminous nature if so desired.

A removable plug 40 is provided in the top of the portion 5 of the casing and the rim 8 has an opening 12 for the purpose of filling the casing with fluid to prevent undersirable oscillation of the movable element. It will be noted that the fin 28 will cooperate with this fluid to dampen the oscillation.

Both the bank and climb pendulums are heavy on the lower side and as they are hung on very delicate pivots, they always come to rest in the same position in relation to the earth, in case of flight in a straight line as mentioned above.

By making the indicators for both the banking and the inclination direct functions of independent pendulums without the intervention of gears, lost motion is avoided and the sensitivity of the instrument is not interfered with. By arranging the banking and inclination scales in alignment, close together, and in the line of vision of the operator, the reading of both scales can be made at a glance with a minimum effort.

It will be apparent that changes in the details of construction, and in the combination and arrangement of parts may be resorted to without departing from the spirit or scope of the invention as hereinafter claimed or sacrificing any of its advantages.

We claim:

1. In a pendulum bank and climb indicator for aircrafts, an indicator plate provided with an opening at the top with means to indicate the center of said opening, a pendulum swinging in a plane parallel to said plate, a dial plate carried by the pendulum and cooperating with the indicator plate, a second indicator plate immediately below said opening, a second pendulum below and in the rear of the first pendulum and swinging in a plane at right angles thereto, a pointer carried by the second pendulum vertically movable adjacent to and in front of the second indicator plate, both the second indicator plate and the pointer being segments of concentric circles having the axis of the second pendulum for their common center.

2. In a pendulum bank and climb indicator for aircrafts, an indicator plate provided with an opening at the top and having a wire centrally therethrough, a pendulum swinging in a plane parallel to said plate and carrying a dial disk having indicia thereon cooperating with the wire, a second indicator plate immediately below said opening, a second pendulum below and in the rear of the first pendulum and swinging in a plane at right angles thereto, a pointer carried by the second pendulum and vertically movable adjacent to and in front of the second indicator plate, both the second indicator plate and the pointer being segments of concentric circles having the axis of the second pendulum for their common center.

3. In a pendulum bank and climb indicator for aircrafts, an indicator plate having an opening with means to indicate the center, of said opening, a pendulum swinging in a plane parallel to said plate and provided with means to cooperate with the indicator plate, a second indicator plate, a second pendulum in the rear of the first pendulum and swinging in a plane at right angles thereto, a pointer carried by the second pendulum and vertically movable adjacent to and in front of the second indicator plate, both the second indicator plate and the pointer being segments of concentric circles having the axis of the second pendulum for their common center.

In testimony whereof we affix our signatures.

DELBERT O. JOHNSON.
WALTER W. WEBSTER.